R. H. Andrews,
Pump Lever,

No 54,483. Patented May 8, 1866.

Witnesses:

Inventor:

UNITED STATES PATENT OFFICE.

R. H. ANDREWS, OF ELIZABETHTOWN, PENNSYLVANIA.

IMPROVEMENT IN PUMPS.

Specification forming part of Letters Patent No. 54,483, dated May 8, 1866.

*To all whom it may concern:*

Be it known that I, R. H. ANDREWS, of Elizabethtown, in the county of Lancaster and State of Pennsylvania, have invented a new and useful Improvement in Pumps; and I do hereby declare that the following is a full and exact description of the same, reference being had to the annexed drawings, making a part of this specification, in which—

Figure 1:
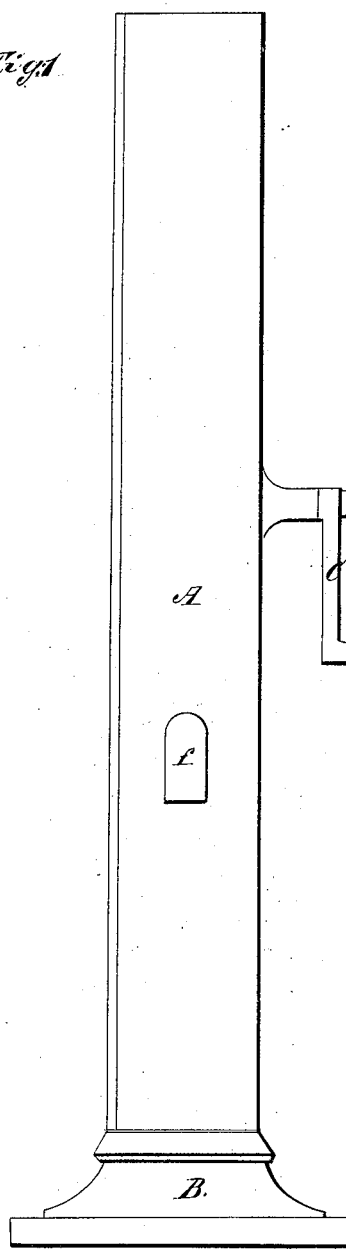
Figure 2:
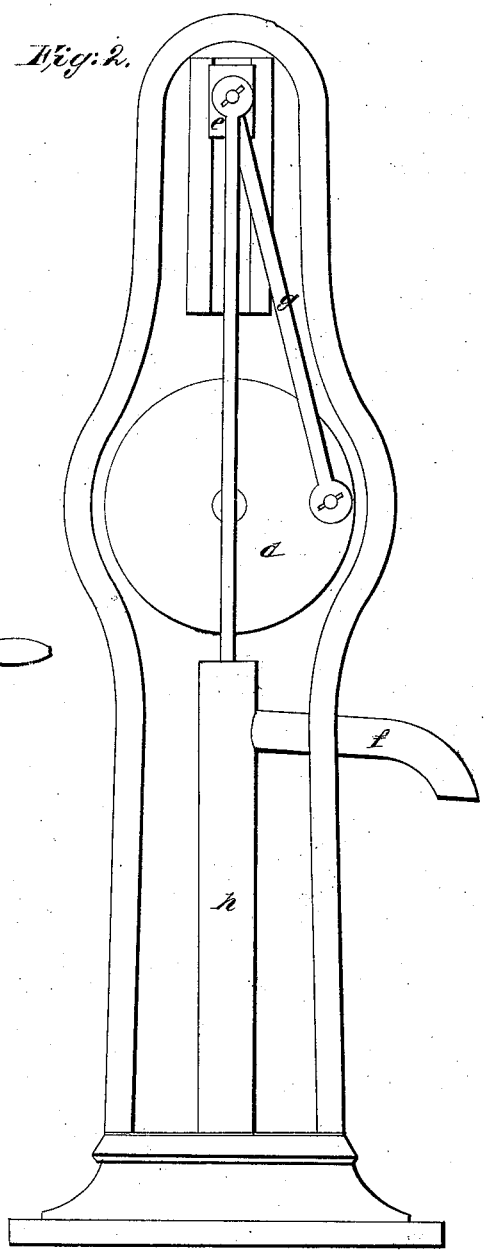

Figure 1 is a front view, and Fig. 2 is a side view, of my improvement.

Similar letters of reference indicate corresponding parts in the two figures.

The nature of my invention consists in producing a rotary motion by means of a wheel, a slide, and a crank, and applied to suction and force pumps, by which the labor of raising water is lessened, the motion rendered more regular, and the pump may be used in places or positions where the old style would be inconvenient.

To enable others skilled in the art to make and use my invention, I will proceed to describe the same.

A represents the pump. B represents the base. C represents the crank. D represents the wheel. E represents the slide. F represents the spout. G represents the rod connecting wheel to the piston or slide. H represents the cylinder of pump.

What I claim as my invention, and desire to secure by Letters Patent, is—

The combination and arrangement of the wheel D, slide E, connecting-rod G, and cylinder H, for the purpose herein set forth.

R. H. ANDREWS.

Witnesses:
 WM. A. McKENNEY,
 THOMAS JACKSON.